(12) United States Patent
Suh et al.

(45) Date of Patent: Sep. 21, 2010
(10) Patent No.: US 7,801,226 B2

(54) FREQUENCY OVERLAY COMMUNICATION SYSTEM AND TRANSMISSION/RECEPTION METHOD THEREOF

(75) Inventors: Chang-Ho Suh, Seongnam-si (KR); Dong-Seek Park, Yongin-si (KR); Sung-Kwon Hong, Seoul (KR); Young-Kwon Cho, Suwon-si (KR); Jin-Kyu Koo, Suwon-si (KR); Jung-Soo Woo, Suwon-si (KR)

(73) Assignee: Samsung Electronics Co., Ltd (KR)

(*) Notice: Subject to any disclaimer, the term of this patent is extended or adjusted under 35 U.S.C. 154(b) by 1051 days.

(21) Appl. No.: 11/443,421

(22) Filed: May 30, 2006

(65) Prior Publication Data

US 2006/0268677 A1    Nov. 30, 2006

(30) Foreign Application Priority Data

May 27, 2005  (KR)  ............... 10-2005-0045266

(51) Int. Cl.
H04L 27/28 (2006.01)
(52) U.S. Cl. .......... 375/260; 375/259; 375/140; 455/59; 370/210
(58) Field of Classification Search ........... 375/260, 375/259; 370/210; 455/59
See application file for complete search history.

(56) References Cited

U.S. PATENT DOCUMENTS

| | | | |
|---|---|---|---|
| 5,907,583 A | 5/1999 | Sakoda et al. | |
| 7,403,472 B2* | 7/2008 | Okada et al. | 370/210 |
| 2002/0154686 A1* | 10/2002 | Ginesi et al. | 375/222 |
| 2002/0159426 A1* | 10/2002 | Kanemoto et al. | 370/342 |
| 2004/0062193 A1* | 4/2004 | Ma et al. | 370/208 |
| 2008/0186843 A1* | 8/2008 | Ma et al. | 370/210 |
| 2008/0304551 A1* | 12/2008 | Li et al. | 375/140 |

FOREIGN PATENT DOCUMENTS

| | | |
|---|---|---|
| JP | 2000-031936 | 1/2000 |
| KR | 1019990007213 | 1/1999 |
| KR | 100226709 | 7/1999 |
| KR | 1999-0088086 | 12/1999 |
| KR | 1020010072602 | 7/2001 |
| KR | 1020020064264 | 8/2002 |
| KR | 1020050041804 | 5/2005 |
| WO | WO 99/65172 | 12/1999 |

* cited by examiner

*Primary Examiner*—Chieh M Fan
*Assistant Examiner*—Kenneth Lam
(74) *Attorney, Agent, or Firm*—The Farrell Law Firm, LLP

(57) ABSTRACT

Provided is a method and apparatus for transmitting/receiving data in a frequency overlay communication system. A transmitter generates a data stream for data transmission, and performs Inverse Fast Fourier Transform (IFFT) on the generated data stream according to a predetermined first frequency band before transmission. Upon receiving a particular signal, a receiver performs Fast Fourier Transform (FFT) on the received signal according to a predetermined second frequency band, and restores the received signal.

3 Claims, 12 Drawing Sheets

FREQUENCY OVERLAY COMMUNICATION SYSTEM AND TRANSMISSION/RECEPTION METHOD THEREOF

PRIORITY

This application claims the benefit under 35 U.S.C. §119(a) of an application filed in the Korean Intellectual Property Office on May 27, 2005 and assigned Ser. No. 2005-45266, the entire contents of which are incorporated herein by reference.

BACKGROUND OF THE INVENTION

1. Field of the Invention

The present invention relates generally to a communication system and a transmission/reception method thereof, and in particular, to a communication system using a frequency overlay scheme ("frequency overlay communication system") and a transmission/reception method thereof.

2. Description of the Related Art

With the development of communication systems, the types of services provided are diversified, raising the need for a broadband communication system supporting broadband service. However, due to the limited frequency resources, there is a limitation on the available frequency band even for the broadband communication system. In addition, because backward compatibility with the previously installed communication systems should also be taken into consideration, the system design is in difficulties.

The current broadband communication systems were designed on the basic premise that they are separately allocated different frequency bands to provide the broadband service in their service areas. However, the increasing demand for the frequency bands for the broadband service increases the license cost for the frequency bands, making it impossible to use the various available schemes proposed to provide the broadband service.

As a result, there is a need for a scheme for efficiently providing the broadband service while overcoming the limitation on the frequency bands, i.e., while solving the high license cost problem for the frequency bands.

SUMMARY OF THE INVENTION

It is, therefore, an object of the present invention to provide a frequency overlay communication system for increasing efficiency of frequency resources, and a transmission/reception method thereof.

It is another object of the present invention to provide a frequency overlay communication system for maximizing a multiuser diversity gain, and a transmission/reception method thereof.

It is further another object of the present invention to provide a frequency overlay communication system for guaranteeing backward compatibility with the existing communication systems, and a transmission/reception method thereof.

It is yet another object of the present invention to provide a communication system with the least complexity for satisfying guaranteeing of backward compatibility with the existing communication systems, and a transmission/reception method thereof.

According to one aspect of the present invention, there is provided a method for transmitting/receiving data in a frequency overlay communication system. The method includes generating a data stream for data transmission, and performing Inverse Fast Fourier Transform (IFFT) on the generated data stream according to a predetermined first frequency band before transmission; and upon receiving a particular signal, performing Fast Fourier Transform (FFT) on the received signal according to a predetermined second frequency band, and restoring the received signal.

According to still another aspect of the present invention, there is provided a method for transmitting/receiving data in a frequency overlay communication system including a first frequency band and a second frequency band having different frequency bandwidths, the first frequency band being included in the second frequency band. The method includes generating a data stream for data transmission, performing IFFT on the generated data stream according to the second frequency band, and performing up-conversion to the second frequency band before transmission; and receiving the transmitted signal, and performing band-pass filtering and FFT on the received signal over a bandwidth of the first frequency band to restore the received signal.

According to further another aspect of the present invention, there is provided a method for transmitting/receiving data in a frequency overlay communication system including a first frequency band and a second frequency band having different frequency bandwidths, the first frequency band being included in the second frequency band. The method includes generating a data stream for data transmission, performing IFFT on the generated data stream according to the first frequency band, and performing up-conversion to the first frequency band before transmission; and receiving the transmitted signal, performing band-pass filtering on the received signal over a bandwidth of the second frequency band, and performing FFT on the band-pass filtered signal according to the second frequency band to restore the received signal.

According to yet another aspect of the present invention, there is provided a method for transmitting/receiving data in a frequency overlay communication system. The method includes generating a data stream for data transmission, combining the data stream with nulling data, and performing IFFT on the combined data according to a predetermined first frequency band before transmission; and receiving the transmitted signal, performing FFT on the received signal according to a predetermined second frequency band, and restoring the received signal.

According to still another aspect of the present invention, there is provided a method for transmitting/receiving data in a frequency overlay communication system including a first frequency band and a second frequency band having different frequency bandwidths, the first frequency band being included in the second frequency band. The method includes generating a data stream for data transmission, combining the data stream with nulling data, and performing inverse IFFT and up-conversion on the combined data according to the second frequency band before transmission; and receiving the transmitted signal, and performing band-pass filtering and FFT on the received signal over a bandwidth of the first frequency band to restore the received signal.

According to still another aspect of the present invention, there is provided a method for transmitting/receiving data in a frequency overlay communication system. The method includes generating a data stream for data transmission, and performing IFFT on the generated data stream according to a predetermined first frequency band before transmission; and receiving the transmitted signal, performing FFT on the received signal according to a predetermined second frequency band, and extracting data except for nulling data included in the received signal through the FFT to restore the received signal.

According to still another aspect of the present invention, there is provided a method for transmitting/receiving data in a frequency overlay communication system including a first frequency band and a second frequency band having different frequency bandwidths, the first frequency band being included in the second frequency band. The method includes generating a data stream for data transmission, and performing inverse LEFT and up-conversion on the generated data stream according to the first frequency band before transmission; and receiving the transmitted signal, performing band-pass filtering and FFT on the received signal over a bandwidth of the second frequency band, and extracting data except for nulling data included in the received signal through the FFT to restore the received signal.

According to still another aspect of the present invention, there is provided a transmission/reception system for transmitting/receiving data in a frequency overlay communication system. The transmission/reception system includes a base station for generating a data stream for data transmission, performing IFFT on the generated data stream according to a predetermined second frequency band before transmission, performing FFT on a particular received signal according to the second frequency band, and restoring the received signal; and a mobile station for generating a data stream for data transmission, performing IFFT on the generated data stream according to a predetermined first frequency band before transmission, performing FFT on a particular received signal according to the first frequency band, and restoring the received signal.

According to still another aspect of the present invention, there is provided a transmission/reception system for transmitting/receiving data in a frequency overlay communication system including a first frequency band and a second frequency band having different frequency bandwidths, the first frequency band being included in the second frequency band. The transmission/reception system includes a base station (BS) for performing IFFT and up-conversion on a transmission data stream according to the second frequency band before transmission; and a mobile station (MS) for performing band-pass filtering and FFT on a signal received from the base station over a bandwidth of the first frequency band to restore the received signal.

According to still another aspect of the present invention, there is provided a transmission/reception system for transmitting/receiving data in a frequency overlay communication system including a first frequency band and a second frequency band having different frequency bandwidths, the first frequency band being included in the second frequency band. The transmission/reception system includes a mobile station (MS) for performing IFFT and up-conversion on a transmission data stream according to the first frequency band before transmission; and a base station (BS) for performing band-pass filtering and FFT on a signal received from the mobile station over a bandwidth of the second frequency band to restore the received signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Several preferred embodiments of the present invention will now be described in detail with reference to the annexed drawings. In the following description, a detailed description of known functions and configurations incorporated herein has been omitted for clarity and conciseness.

The present invention provides a communication system using a frequency overlay scheme (hereinafter referred to as a "frequency overlay communication system") and a transmission/reception method thereof. In addition, the present invention provides a frequency overlay communication system capable of solving the high license cost problem for frequency bands due to the limited frequency bandwidths, guaranteeing backward compatibility with the existing communication systems due to the use of the frequency overlay scheme, providing a transceiver structure having the least complexity for satisfying guaranteeing of the backward compatibility, and providing the maximum throughput through efficient scheduling, and a transmission/reception method thereof.

In addition, the present invention relates to design of an overlay broadband system that overlays the existing systems in a frequency band, and provides detailed transceiver modules thereof, scenarios thereof, and Inverse Fast Fourier Transform (IFFT)/Fast Fourier Transform (FFT) modules for implementing the same. These modules are designed so as to have the least complexity to guarantee backward compatibility of a mobile station (MS) in the existing system.

In the following description, the present invention is roughly divided into two possible cases as follows: one case in which an extended bandwidth is a multiple of $2^m$ and another case in which an extended bandwidth is not a multiple of $2^m$. In the former case where the extended bandwidth is a multiple of $2^m$, a transceiver is designed using $2^m$ IFFT/FFT modules. On the contrary, in the latter case where the extended bandwidth is not a multiple of $2^m$, because the use of Discrete Fourier Transform (DFT) modules considerably increases the complexity, the transceiver is designed using only the IFFT/FFT modules in the present invention.

In order to make up for the defects that the use of only the IFFT/FFT modules increases the number of RF modules, the present invention provides preferred design schemes that take into account the complexity of a baseband stage of the RF module as well according to system conditions.

With reference to the accompanying drawings, a description will now be made of a preferred operation and structure according to the present invention.

Figure 1:
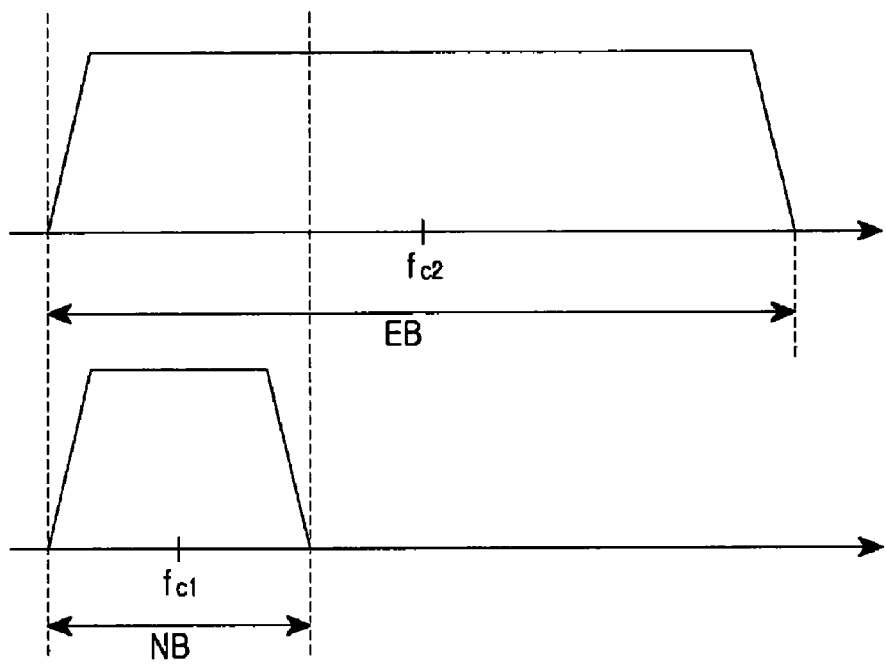
FIG. 1 is a diagram illustrating a frequency allocation operation in a frequency overlay communication system according to the present invention.

FIG. 1 is a diagram illustrating a frequency allocation operation in a frequency overlay communication system according to the present invention. It will be assumed in FIG. 1 that as illustrated, the communication system previously installed before the frequency overlay communication system is designed, i.e., a non-frequency overlay communication system, already uses a carrier frequency $fc_1$ and its associated frequency band.

For convenience, the non-frequency overlay communication system will be referred to as a Narrow Band (NB) communication system and the frequency overlay communication system will be referred to as an Extended Band (EB) communication system. Herein, the non-frequency overlay communication system is referred to as an NB communication system because a frequency band used in the non-frequency overlay communication system is relatively narrower than a frequency band used in the frequency overlay communication system. This does not mean that the frequency band used in the non-frequency overlay communication system is absolutely narrow.

If the types of services intended to be provided in the NB communication system are diversified and the required throughput increases, the NB communication system should extend a bandwidth of its frequency band in use. Therefore, a communication system, the bandwidth of whose frequency band in use is extended, can be taken into consideration, and the communication system with the extended bandwidth of its frequency band in use can be designed such that it is overlaid with the NB communication system in a frequency band. The communication system, whose frequency band in use is determined in such a manner that it is overlaid with the NB communication system in the frequency band, is a frequency overlay communication system, i.e., an EB communication system. Application of the frequency overlay scheme is taken into consideration for the following purposes.

(1) For Reduction in License Cost for Frequency Band

The license cost occurring because of the extension of the required frequency band greatly increases due to the limited frequency resources. The increase in the license cost for the frequency bands is a heavy burden on the service providers. Deployment of a frequency band being different from the frequency band used in the NB communication system not using the frequency overlay scheme causes additional license cost for the frequency bands, like in the case where a new NB communication system uses a new frequency band. However, the use of the frequency overlay scheme requires only the additional license cost for the bandwidth additionally increased. As a result, the burden of the license cost for the frequency bands on the service providers decreases because they are allowed to bear only the additional license cost.

(2) For Increase in Frequency Resource Efficiency in Overlay Frequency Band

The use of the frequency overlay scheme illustrated in FIG. 1 increases frequency resource efficiency in the overlaid frequency band. One of the factors for determining performance of the general communication system is frequency efficiency, and the frequency efficiency is also very important for the service providers because the service providers can benefit from their subscribers in proportion to the frequency resource efficiency.

Generally, an increase in the number of subscribers available in a particular frequency band can acquire a scheduling gain, which is called a multiuser diversity gain. Therefore, when the frequency overlay scheme is used, the overlay frequency band is shared not only by the subscribers of the NB communication system but also by the subscribers of the EB communication system, resulting in an increase in the number of subscribers available in the overlay frequency band. This contributes to an increase in the frequency resource efficiency. A specific increment in the frequency resource efficiency differs according to a scheduling scheme of a scheduler used in the EB communication system, and it is preferable to use a scheduling scheme that maximizes the frequency resource efficiency.

The frequency allocation operation in the EB communication system according to the present invention has been described so far with reference to FIG. 1. Next, with reference to FIG. 2, a description will be made of a preferred transceiver module used in an EB communication system according to the present invention.

Figure 2:
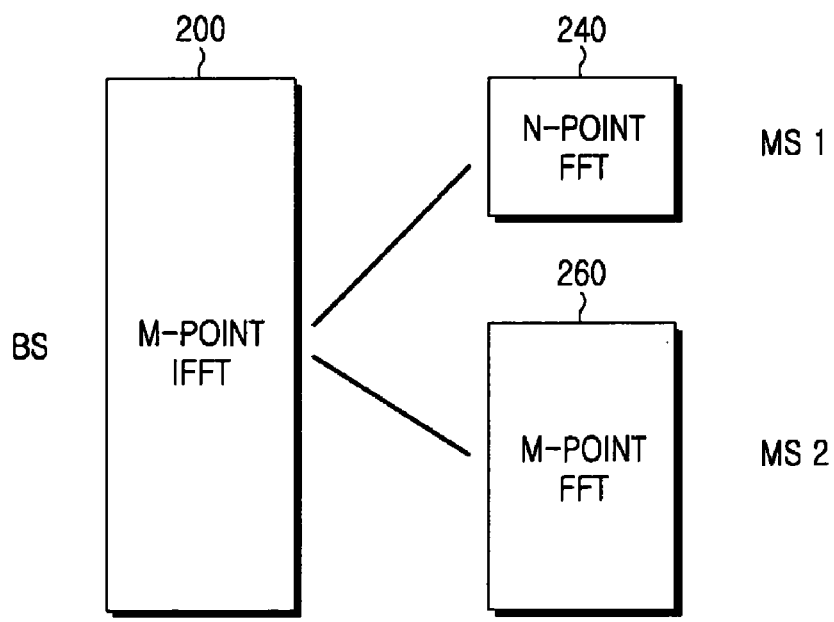
FIG. 2 is a diagram illustrating a preferred transceiver module used in an Extended Band (EB) communication system according to the present invention.

FIG. 2 is a diagram illustrating a preferred transceiver module used in an EB communication system according to the present invention. It is assumed in FIG. 2 that the number of IFFT/FFT points of a transceiver module used in a communication system before a bandwidth of its frequency band in use is extended, i.e., an NB communication system, is N, and the number of IFFT/FFT points of a transceiver module used in a communication system after a bandwidth of its frequency bandwidth in use is extended, i.e., an EB communication system, is M (where M>N).

In this case, a base station (BS) 200 can support services to a mobile station (MS), i.e., an MS1 240, of the NB communication system and an MS, i.e., an MS2 260, of the EB communication system simply with an M-point IFFT/FFT module without separately including an N-point IFFT/FFT module. In order to support services to the MSs of both the NB communication system and the EB communication system simply with one IFFT/FFT module, i.e., the M-point IFFT/FFT module, in this way, it is necessary to provide a guard band between boundary frequency band of the NB communication system and the EB communication system. A specific size of the guard band depends upon performance of a band-pass filter (BPF).

The transceiver module used in the EB communication system according to the present invention has been described so far with reference to FIG. 2. Next, with reference to FIG. 3, a description will be made of an alternative exemplary transceiver module used in an EB communication system according to an embodiment of the present invention.

Figure 3:
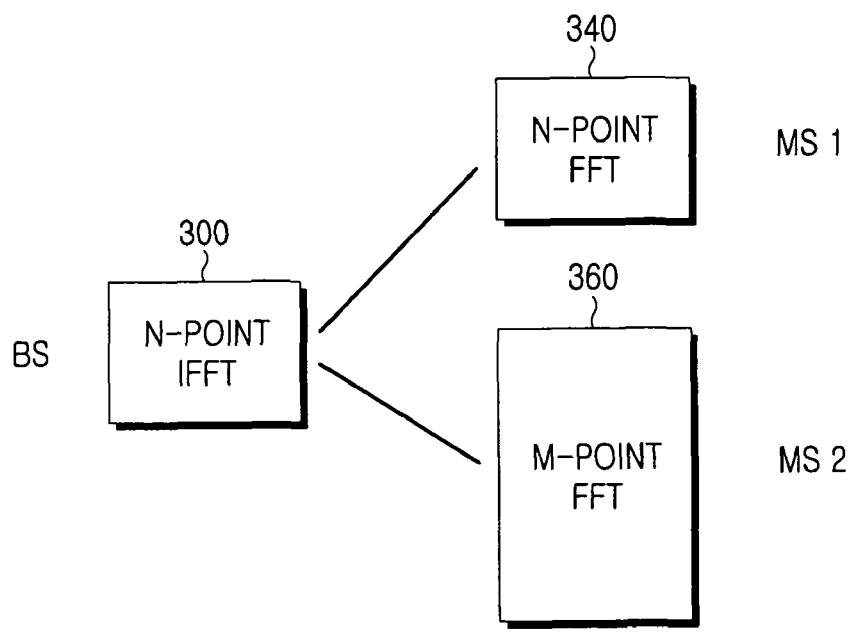
FIG. 3 is a diagram illustrating a alternative preferred transceiver module used in an EB communication system according to the present invention.

FIG. 3 is a diagram illustrating an alternative preferred transceiver module used in an EB communication system according to the present invention. Similarly, it is assumed in FIG. 3 that the number of IFFT/FFT points of a transceiver module used in the NB communication system is N, and the number of IFFT/FFT points of a transceiver module used in the EB communication system is M (where M >N).

On the contrary, however, when the system is extended, BSs using the frequency overlay scheme may be deployed in such a way that in a particular region, BSs using the frequency overlay scheme cannot be deployed and only the BSs not using the frequency overlay scheme can be deployed. For convenience, in the following description, the BS using the frequency overlay scheme will be referred to as an 'EB-BS', and the BS not using the frequency overlay scheme will be referred to as an 'NB-BS'.

Of course, after the system extension is completed, there is almost no case where only the NB-BSs are deployed in a particular region. However, in the course of the system extension, such cases inevitably occur. Therefore, unlike the BS 200 of FIG. 2, the BS 300 of FIG. 3, if it is an NB-BS, should take into account even the IFFT/FFT points of the transceiver module used in the EB communication system.

The BS 300 uses only an N-point IFFT/FFT module, because it is an NB-BS as stated above. As described with reference to FIG. 2, if there is only the guard band between the frequency band used in the EB communication system and the frequency band used in the NB communication system, the NB-BS 300 can communicate with an MS1 340 having an N-point IFFT/FFT module as well as with an MS2 360 having an M-point IFFT/FFT module, using only the N-point IFFT/FFT module. Also, as described with reference to FIG. 2, a specific size of the guard band depends upon performance of a BPF.

The alternative preferred transceiver module used in the EB communication system according to the present invention has been described so far with reference to FIG. 3. Next, with reference to FIG. 4, a description will be made of a basic concept for downlink (DL) data transmission/reception between BS-MS in an EB communication system according to the present invention.

Figure 4:
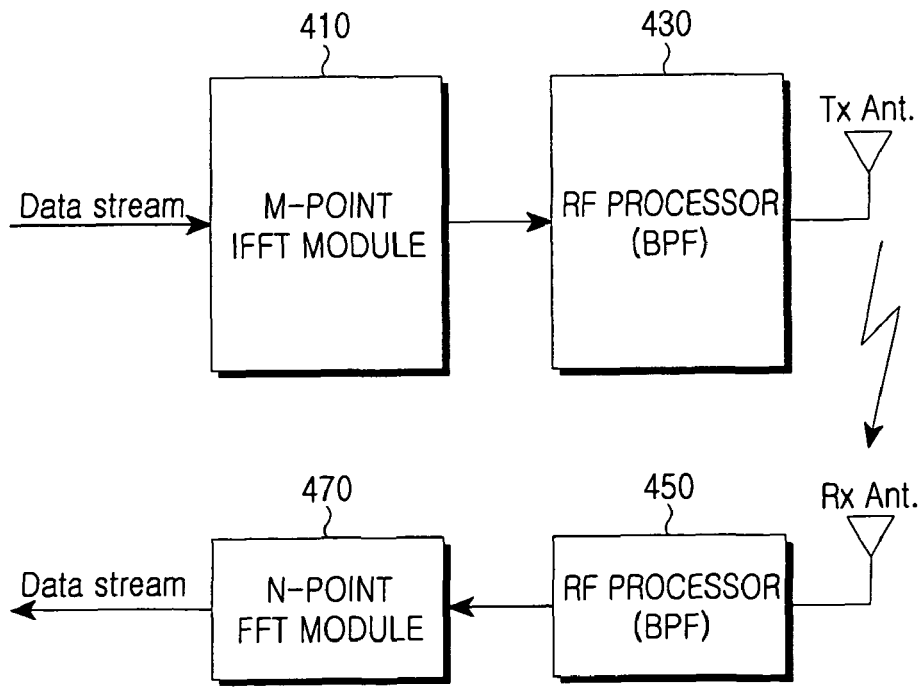
FIG. 4 is a diagram illustrating a preferred downlink data transmission/reception process for an EB communication system according to the present invention.

FIG. 4 is a diagram illustrating a preferred downlink data transmission/reception process for an EB communication system according to the present invention.

Referring to FIG. 4, in a downlink, a BS corresponding to a transmitter generates a data stream for downlink data transmission. Herein, the data stream represents the data that was already channel-coded to increase reliability at the transmitter. Because a detailed method for generating the data stream is not directly related to the present invention, a detailed description thereof will be omitted herein. However, it will be assumed that the data stream includes both traffic information of several users as well as control information. The control information includes information on resource positions to which traffic information of each user is mapped. It is assumed that the resource mapping is achieved such that the users are disjoint from each other in terms of the resources.

The data stream passes through an M-point IFFT module 410, where M is defined as $M=2^m \times N$. The present invention mainly aims at determining operability between an $M=2^m \times N$-point IFFT module 410 of an EB communication system and an N-point FFT module 470 of an NB communication system. Therefore, it is assumed that the desirable signal by a receiver is mapped only to the N-point part in the $2^m \times N$-point IFFT module.

Next, the data passed through the M-point IFFT, module 410 passes through a Radio Frequency (RF) processor 430. The RF processor 430 includes a BPF, and up-conversion to a band of a carrier frequency $f_{c2}$ used in the EB communication system is achieved through the BPF. Thereafter, band-pass filtering is performed taking into account the bandwidth $W_{EB}$ occupied by the $2^m \times N$ points. The data, after passing through the above process, is transmitted via a transmission antenna TxAnt.

In the downlink, an MS corresponding to a receiver receives the signal transmitted from the transmitter, i.e., the BS, via a reception antenna RxAnt. Thereafter, the MS performs band-pass filtering over a bandwidth $W_{NB}$ corresponding to N points. Due to the band-pass filtering over the bandwidth $W_{NB}$, even the data transmitted by the BS with an $M=2^m \times N$-point IFFT module can be restored only with the N-point FFT module rather than the $2^m \times N$-point IFFT module. A detailed description thereof will be made below with reference to a preferred case of m=1. Next, the signal, after completion of the band-pass filtering, can be restored to its original signal through the N-point FFT module 470. That is, based on a control signal, the MS detects a position of a resource allocated thereto, and then restores the traffic signal.

In the following description, it will be shown that for m=1, the data passed through the 2N-point IFFT process can be decoded only with the N-point FFT process through the band-pass filtering process.

A signal X(k) input to the 2N-point IFFT module can be defined as expressed in Equation (1) below.

$$X(k)=X_{NB}(k),\ 0 \leq k \leq N-1$$
$$X(k)=X_{EB}(k),\ N \leq k \leq 2N-1 \qquad (1)$$

As shown in Equation (1), $X_{NB}(k)$ denotes a data value in an NB frequency domain, for $0 \leq k \leq N-1$, and $X_{EB}(k)$ denotes a data value in an EB frequency domain, for $N \leq k \leq 2N-1$.

Next, a signal x(n) in a time domain, obtained after the X(k) passes through the 2N-point IFFT module, can be defined as expressed in Equation (2) below.

$$\begin{aligned} x(n) &= \frac{1}{2N} \sum_{k=0}^{2N-1} X(k) e^{j\frac{2\pi}{2N}kn} \\ &= \frac{1}{2N}\left(X_{NB}(k) + X_{EB}(k)e^{j2\pi \frac{n}{2}}\right)e^{j\frac{2\pi}{2N}kn} \end{aligned} \qquad (2)$$

Next, a signal $x^{BPF}(n)$ in the time domain, obtained after the receiver performed band-pass filtering over the NB bandwidth $W_{NB}$, can be expressed as set forth in Equation (3) below.

$$x^{BPF}(n) = BPF(x(n)) = \frac{1}{2N} \sum_{k=0}^{N-1} X_{NB}(k) e^{j\frac{2\pi}{2N}kn} \qquad (3)$$

A signal Y(k) in the frequency domain, obtained when the receiver performed N-point FFT without performing the band-pass filtering, can be expressed as set forth in Equation (4) below.

$$Y(k) = \frac{1}{2}(X_{NB}(k) + X_{EB}(x)) \qquad (4)$$

That is, there is an interference signal $X_{EB}(X)$ in addition to the signal $X_{NB}(k)$ desired in the present invention. On the contrary, by performing FFT on the signal $X^{BPF}(n)$ that passed through the band-pass filtering in the time domain, it is possible to obtain only the signal $Y^{BPF}(k)$ desired in the present invention, shown in Equation (5) below.

$$Y^{BPF}(k) = FFT(x^{BPF}(n)) \quad (5)$$
$$= \frac{1}{2} X_{NB}(k)$$

Through the foregoing processes, data restoration is possible by making good use of band-pass filtering in an RF stage even within the communication systems using different frequency bands, like 2N-point IFFT transmission and N-point FFT reception, i.e., the EB communication system with M IFFT points and the NB communication system with N FFT points, and vice versa.

The preferred data flow in the downlink of the EB communication system according to the present invention has been described so far with reference to FIG. 4. Next, with reference to FIG. 5, a description will be made of a preferred data flow in an uplink of the EB communication system according to the present invention.

Figure 5:
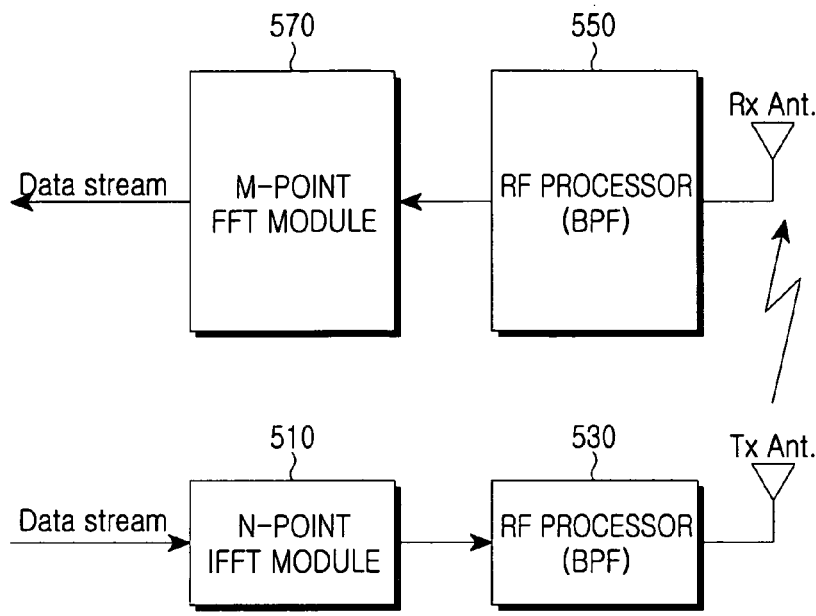
FIG. 5 is a diagram illustrating a preferred data flow in an uplink for an EB communication system according to the present invention.

FIG. 5 is a diagram illustrating a preferred data flow in an uplink for an EB communication system according to the present invention.

Referring to FIG. 5, in an uplink, an MS corresponding to a transmitter generates a data stream for uplink data transmission. The data stream represents the data that was already channel-coded to increase reliability at the transmitter. Because a detailed method for generating the data stream is not directly related to the present invention, a detailed description thereof will be omitted herein. However, it will be assumed that the data stream includes both uplink traffic information as well as control information. It is also assumed that resource mapping of the uplink traffic information is achieved such that users are disjoint from each other in terms of the resources.

Thereafter, the data stream passes through an N-point IFFT module 510. The present invention mainly aims at determining operability between an N-point IFFT module of an NB communication system and a $2^m \times$N-point FFT module. Therefore, at a receiver, only the signal of N-points among the signals of $2^m \times$N points become a desirable signal.

Subsequently, the data passes through an RF processor 530, and up-conversion to a band of a carrier frequency $f_{c1}$ used in the NB communication system is achieved in the RF processor 530. Thereafter, band-pass filtering is performed taking into account the bandwidth $W_{NB}$ occupied by the N-points. The data, after passing through the above process, is transmitted via a transmission antenna TxAnt.

In the uplink, a BS corresponding to a receiver receives the signal transmitted from the transmitter, i.e., the MS, via a reception antenna RxAnt. Thereafter, the BS performs band-pass filtering on the received signal over a bandwidth $W_{EB}$ corresponding to $2^m \times$N-points. Due to the band-pass filtering over the bandwidth $W_{EB}$, even the data transmitted with an N-point IFFT module can be restored through the $2^m \times$N-point FFT process rather than the N-point FFT process. This is very similar to the case of the downlink, so a detailed description thereof will be omitted.

The preferred data flows in the uplink and the downlink of the EB communication system according to the present invention have been described so far with reference to FIGS. 4 and 5. Next, a detailed description will be made of various transmission methods used in the EB communication system according to the present invention.

Figure 6:
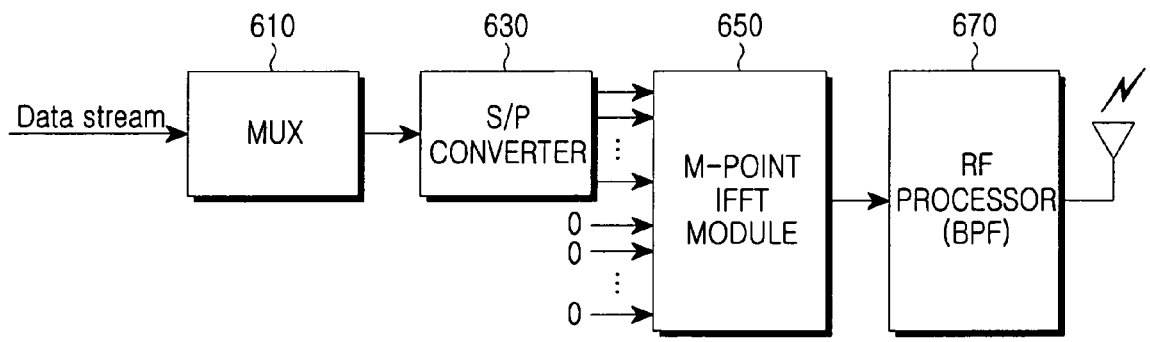
FIG. 6 is a diagram illustrating a structure of a transmitter for a description of a transmission method used in an EB communication system according to the present invention.

FIG. 6 is a diagram illustrating a structure of a transmitter for a description of a transmission method used in an EB communication system according to the present invention. Before a description of FIG. 6 is given, it should be noted that FIG. 6 illustrates a transmission method for the case in which an extended bandwidth used in the EB communication system is not $2^m$ times the existing bandwidth and only one RF processor is used.

As described with reference to FIGS. 4 and 5, when the extended bandwidth of the EB communication system is $2^m$ times the existing bandwidth, complexity of the transceiver can be minimized using the IFFT/FFT module. However, when the extended bandwidth is not $2^m$ times the existing bandwidth, it is general that the IFFT/FFT module cannot be used. Therefore, in this case, an Inverse Discrete Fourier Transform (IDFT)/Discrete Fourier Transform (DFT) module should be used instead of the IFFT/FFT module, but the IDFT/DFT module has very high complexity.

For example, actually, complexity of an N-point IFFT/FFT module is $N\log_2 N$, whereas complexity of an N-point IDFT/DFT module is $N^2$. Thus, it can be noted that when the N is a very large number, a complexity difference is very large. Therefore, it is preferable not to use the IDFT/DFT module even for the case where the extended bandwidth is not a multiple of $2^m$.

To solve the above problem, the present invention considers the following method. That is, if a multiple k is not $2^m$ ($k \neq 2^m$), the embodiment performs IFFT, the number of points of which is larger than k and equal to a square of 2. Subsequently, only a desired number of points are mapped to the IFFT-processed data, and the remaining part except for the mapped part is filled with 0. A detailed process thereof will be described with reference to FIG. 6.

Referring to FIG. 6, a transmitter according to the present invention includes a multiplexer (MUX) 610, a serial-to-parallel (S/P) converter 630, an M=$2^m \times$N-point IFFT module 650, and an RF processor 670.

As illustrated in FIG. 6, a data stream is generated into k×N data points through the MUX 610 and the S/P converter 630, where k denotes a multiple of the bandwidth extended from the existing bandwidth. Next, the generated data points are mapped to some of the $2^m \times$N-point IFFT module 650, i.e., a predetermined number of points set according to the system conditions. At the same time, the remaining part except for the mapped part is nulled, i.e., filled with 0. The data, after passing through the $2^m \times$N-point IFFT module 650, is up-converted using a carrier frequency $f_{c2}$ used in the EB communication system. Thereafter, the up-converted data is transmitted to a receiver via a band-pass filter with a bandwidth $W_{EB}$ corresponding to k×N points rather than $2^m \times$N-points, and an antenna.

The foregoing method is advantageous in that it uses only one RF processor. However, because the method should perform a large-size IFFT process for the non-transmitted data in a baseband stage, a method for solving the problem in the baseband stage will be considered as an alternative embodiment of the present invention. That is, other embodiments of the present invention for solving the problem due to the structure of FIG. 6 will be described below.

Figure 7A:
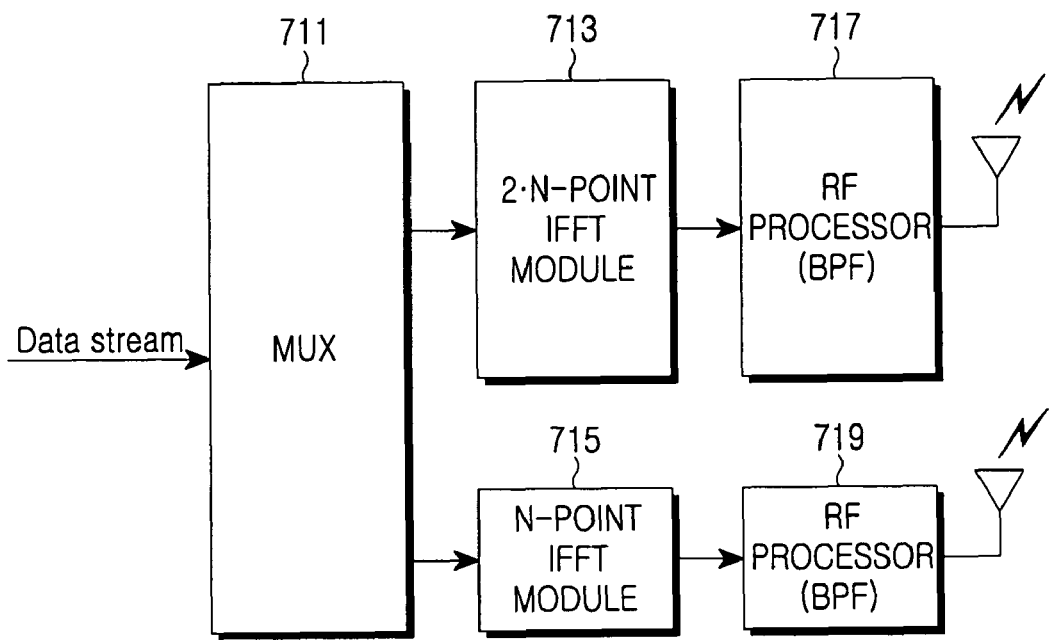
FIGS. 7A and 7B are diagrams for a description of a transmission method using more than two RF processors in an EB communication system according to the present invention.
Figure 7B:
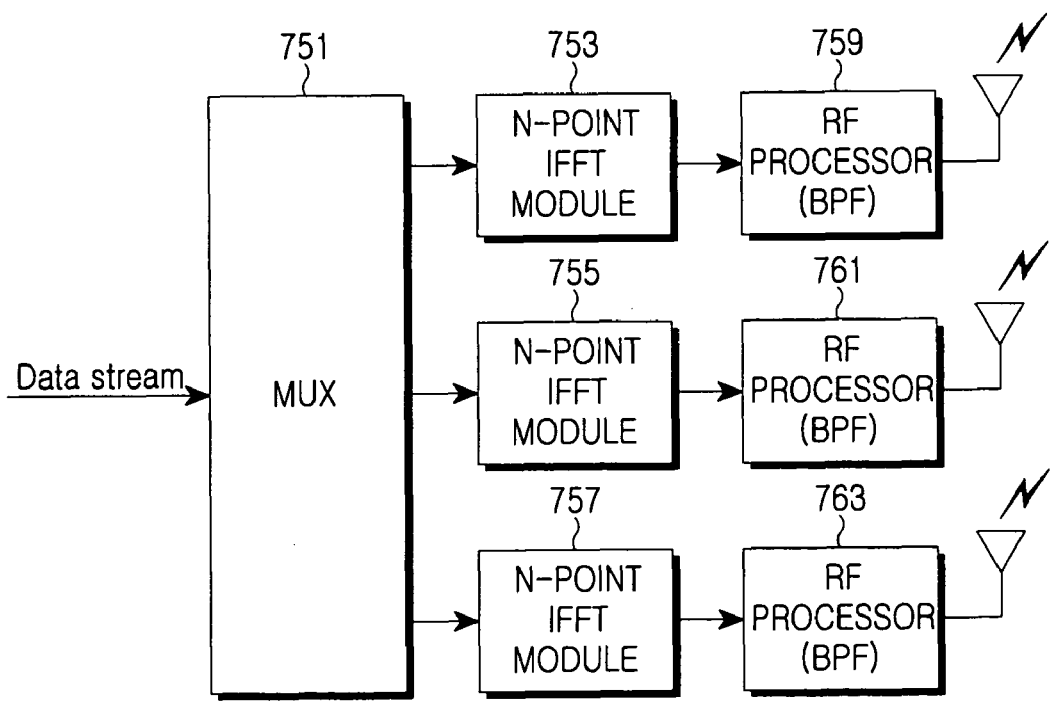

FIGS. 7A and 7B are diagrams for a description of a transmission method using more than two RF processors in an EB communication system according to the present invention. FIG. 7A shows a transmission method for the case where two RF processors are used, and FIG. 7B shows a transmission method for the case where three RF processors are used.

Before a description of FIGS. 7A and 7B is given, it should be noted that FIGS. 7A and 7B show preferred transmitter structures for a description of various transmission methods for the case where an extended bandwidth used in the EB communication system according to the present invention is 3 times the existing bandwidth, and two RF processors are used. With reference to FIGS. 7A and 7B, a description will now be made of various transmission methods through the transmitter structure. The use of several RF processors can reduce complexity of the baseband stage, and several methods of using the RF processors will be described below.

It will be assumed in FIG. 7 that the extended bandwidth is 3 times the existing bandwidth (k=3).

With reference to FIG. 7A, a description will be made of a transmission method for a first preferred case in which two RF processors are used. As illustrated in FIG. 7A, 3N points desired in the present invention can be obtained through one 2N-point IFFT module 713 and one N-point IFFT module 715. In this case, the baseband complexity can be calculated by Equation (6) below.

$$N \times \log_2 N + 2N \times \log_2(2N) \qquad (6)$$

As shown in Equation (6), because the baseband complexity is approximately $N \times \log_2 N + 2N \times \log_2(2N)$, this method can obtain a gain in terms of the complexity, compared with the method of using a 4N-point IFFT module. However, because two RF processors are used and the band-pass filtering process is performed, a guard band should be provided between the 2N-point IFFT module 713 and the N-point IFFT module 715, causing a reduction in data efficiency.

Next, with reference to FIG. 7B, a description will be made of a transmission method for a second preferred case in which three RF processors are used. As illustrated in FIG. 7B, the 3N points can be realized using three N-point IFFT modules, i.e., an N-point IFFT module 753, an N-point IFFT module 755, and an N-point IFFT module 757. In this case, the baseband complexity can be expressed as set forth in Equation (7) below.

$$3 \times N \log_2 N \qquad (7)$$

As shown in Equation (7), because the baseband complexity is approximately $3 \times N \log_2 N$, this method, compared with the method of using two RF processors, has low complexity, but uses the largest number of wireless modules and also uses the largest number of guard bands between the respective IFFT modules.

Therefore, it is preferable to design the system by selecting an optimal method among possible methods taking into account the baseband complexity, the complexity of RF processors, and the data efficiency.

Figure 8A:
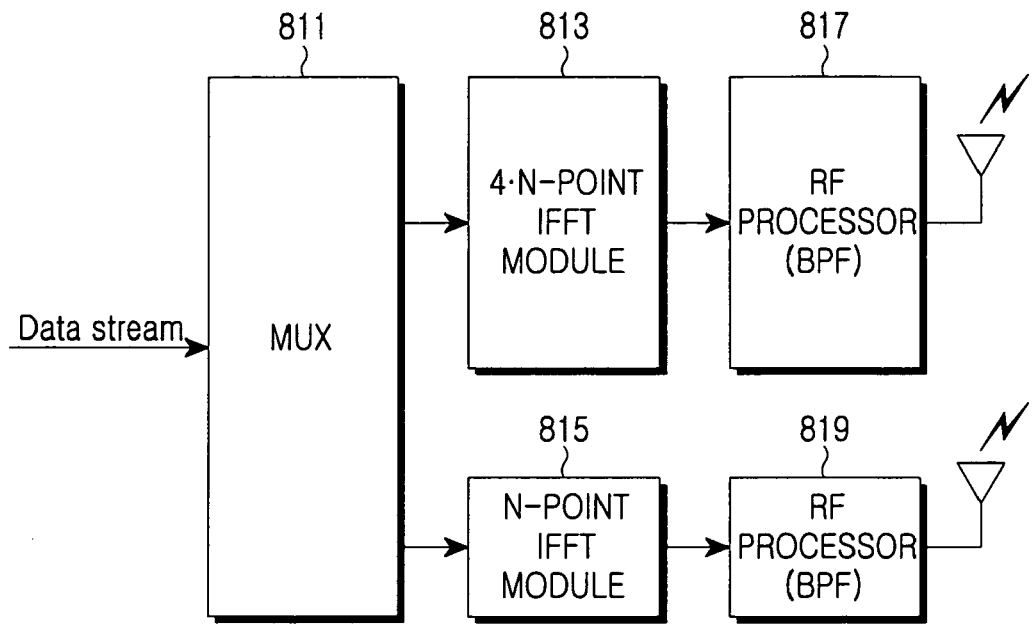
FIGS. 8A to 8D are diagrams illustrating various transmitter structures for a description of a transmission method used in an EB communication system according to the present invention.
Figure 8B:
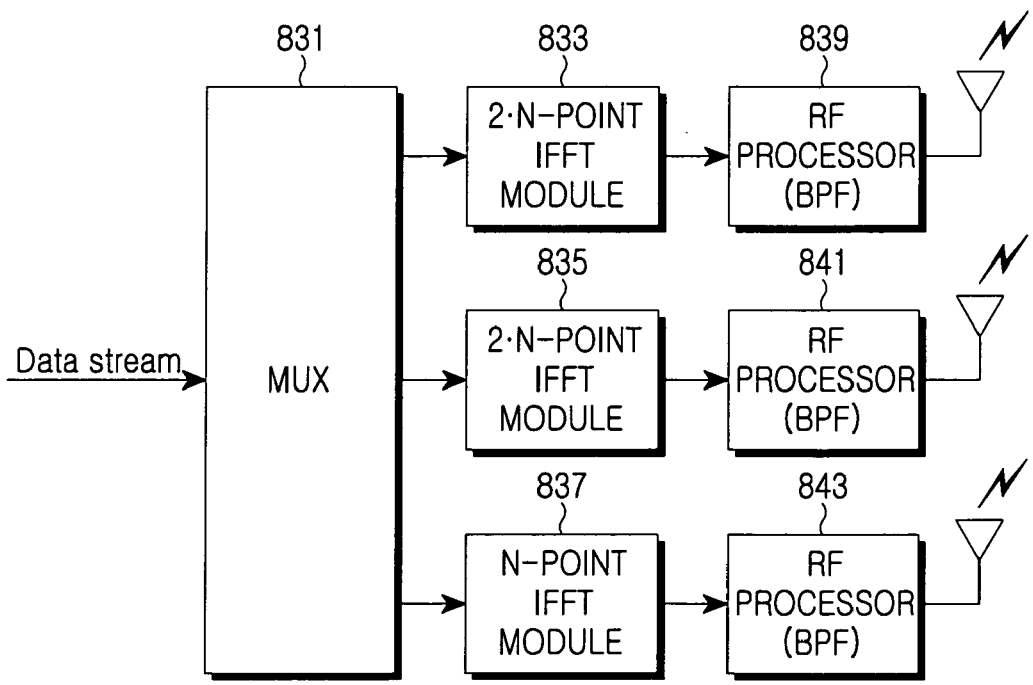
Figure 8C:
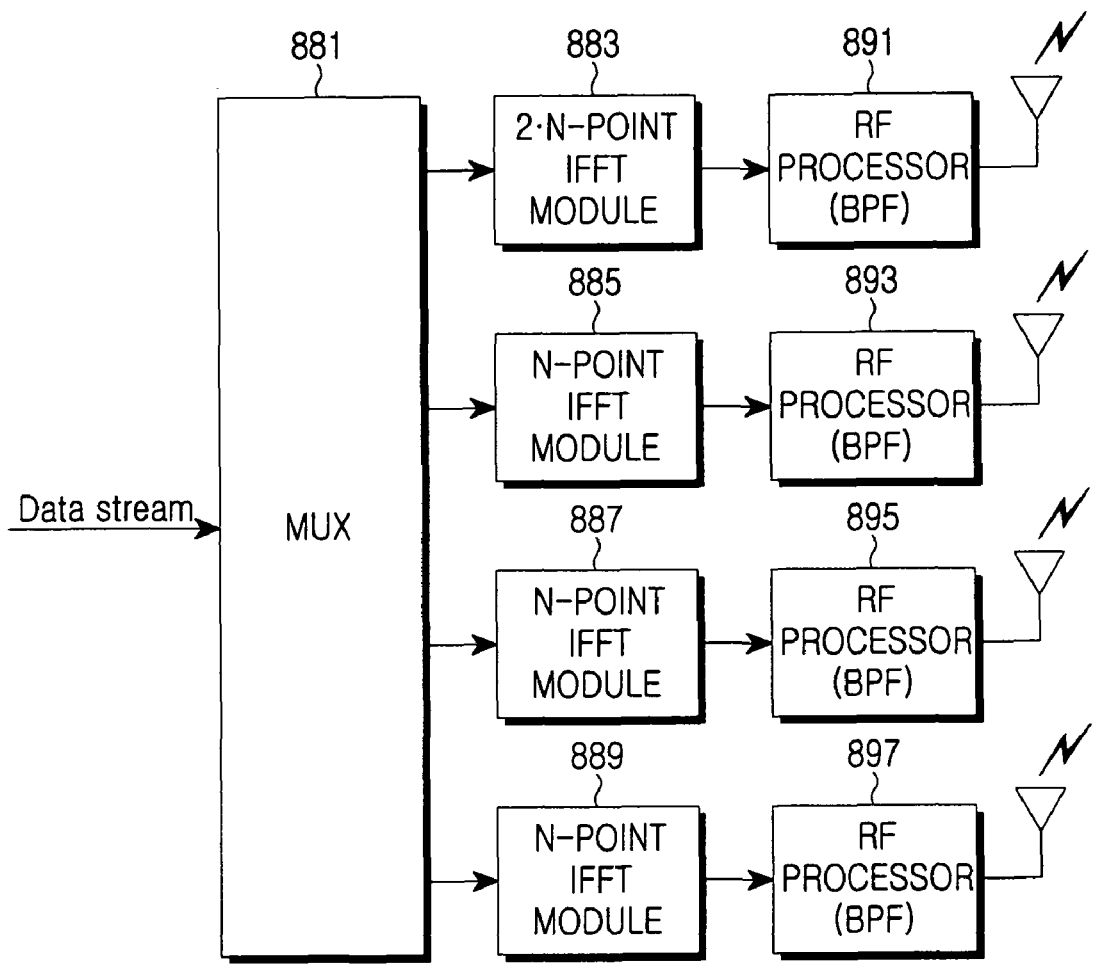
Figure 8D:
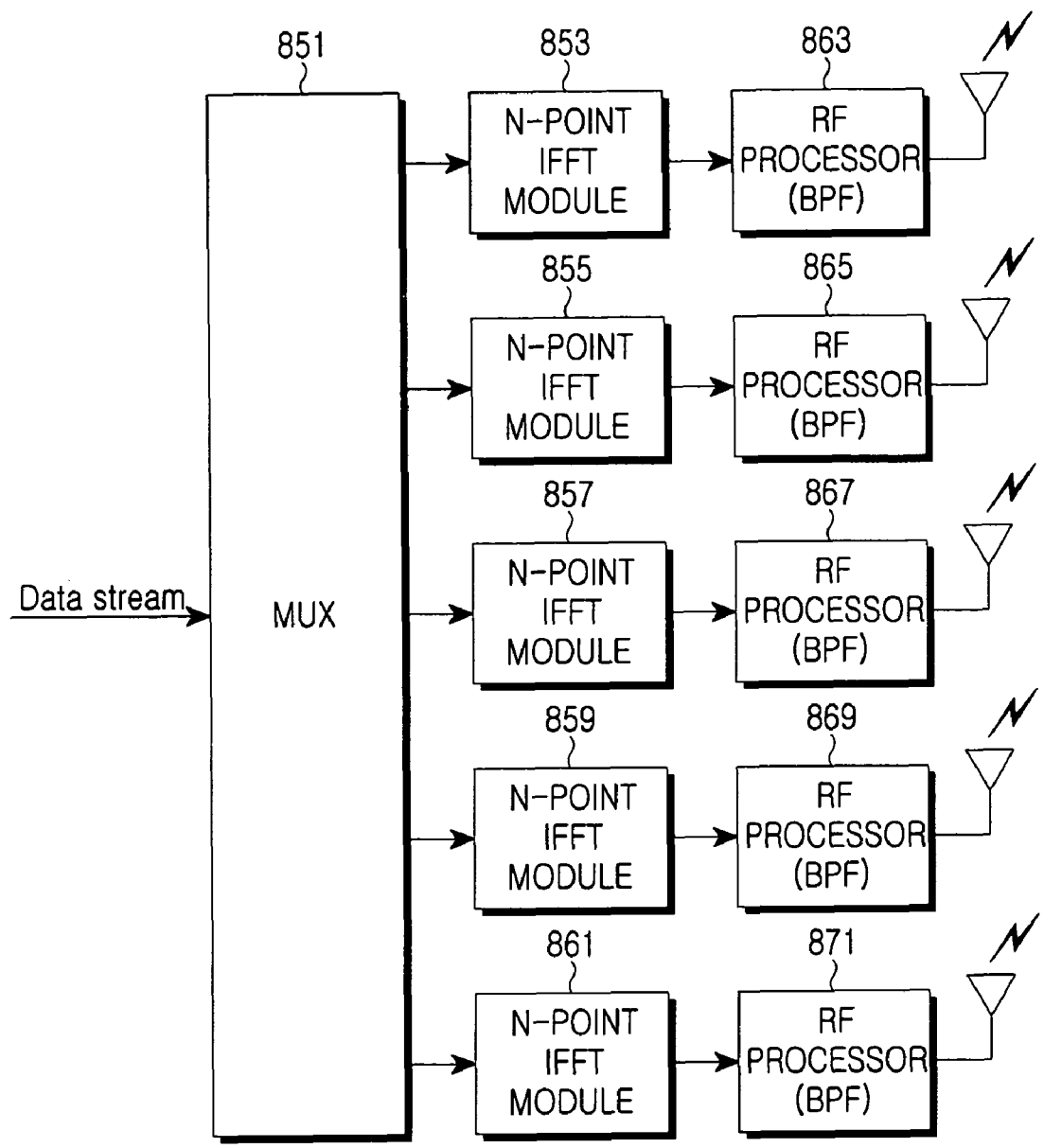

FIGS. 8A to 8D are diagrams illustrating various transmitter structures for a description of a transmission method used in an EB communication system according to an embodiment of the present invention. FIG. 8A shows a transmission method for the case where two RF processors are used, FIG. 8B shows a transmission method for the case where three RF processors are used, FIG. 8C shows a transmission method for the case where four RF processors are used, and FIG. 8D shows a transmission method for the case where five RF processors are used.

Before a description of FIGS. 8A to 8D is given, note that FIGS. 8A to 8D show preferred transmitter structures for a description of various transmission methods for the case where an extended bandwidth used in the EB communication system according to the present invention is five (5) times the existing bandwidth (k=5), and more than two RF processors are used. Compared with k=3, k=5 can provide more possible preferred transmission methods. In the following description, four transmission methods will be considered according to the number of RF processors. Because each of the preferred transmitter structures performs a similar operation to that of FIGS. 7A and 7B, a detailed description thereof will be omitted. However, it should be noted that the transmitter structure depends upon the number of IFFT/FFT points of the transceiver module used in the EB/NB communication system according to the present invention.

With reference to FIG. 8A, a description will be made of a transmission method for a first preferred case in which two RF processors are used. As illustrated in FIG. 8A, 5N points can be realized through one 4N-point IFFT module 813 and one N-point IFFT module 815.

With reference to FIG. 8B, a description will be made of a transmission method for a second preferred case in which three RF processors are used. As illustrated in FIG. 8B, SN points can be realized through two 2N-point IFFT modules 833 and 835, and one N-point IFFT module 837.

With reference to FIG. 8C, a description will be made of a transmission method for a third preferred case in which four RF processors are used. As illustrated in FIG. 8C, SN points can be realized through one 2N-point IFFT module 883, and three N-point IFFT modules 885,887 and 889.

Finally, with reference to FIG. 8D, a description will be made of a transmission method for a fourth preferred case, in which five RF processors are used. As illustrated in FIG. 8D, 5N points can be realized through five N-point IFFT modules 853, 855, 857, 859 and 861.

Figure 9:
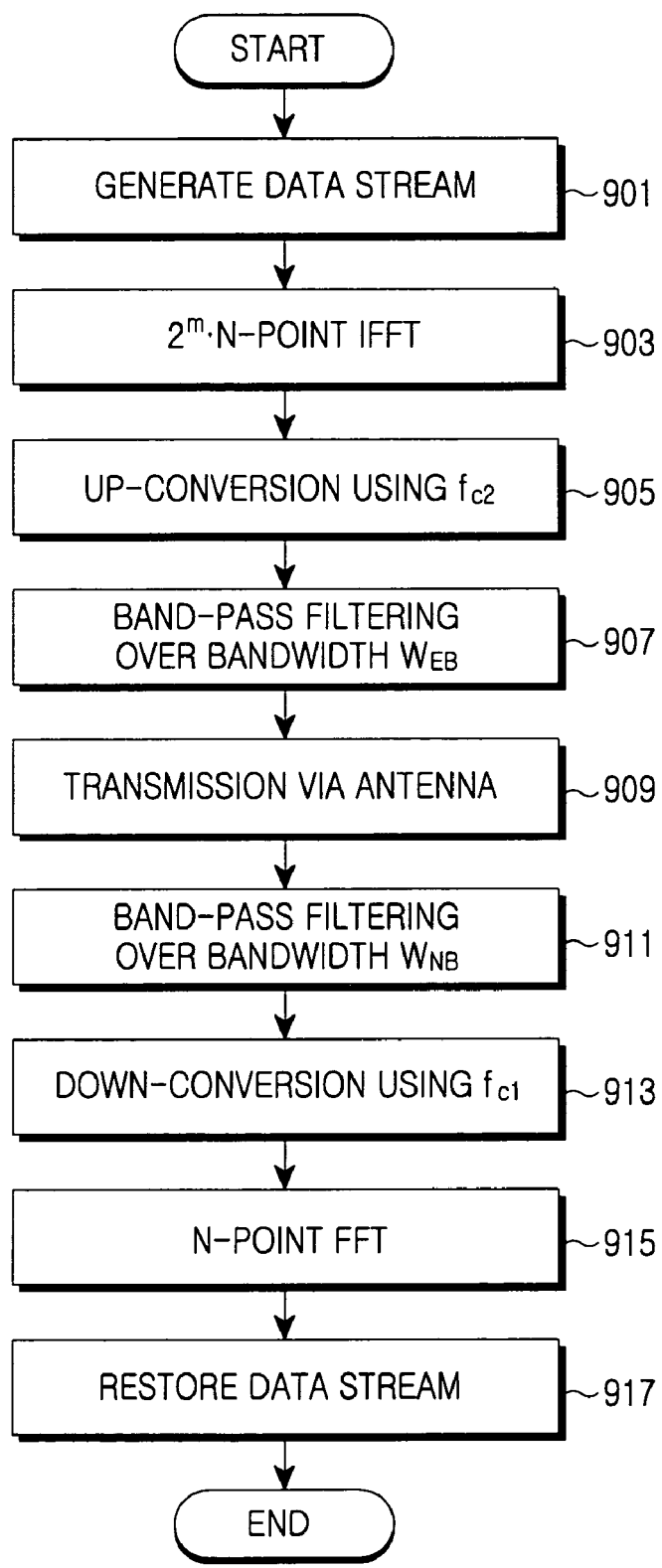
FIG. 9 is a diagram illustrating a downlink data transmission/reception process for an EB communication system according to the present invention.
Figure 10:
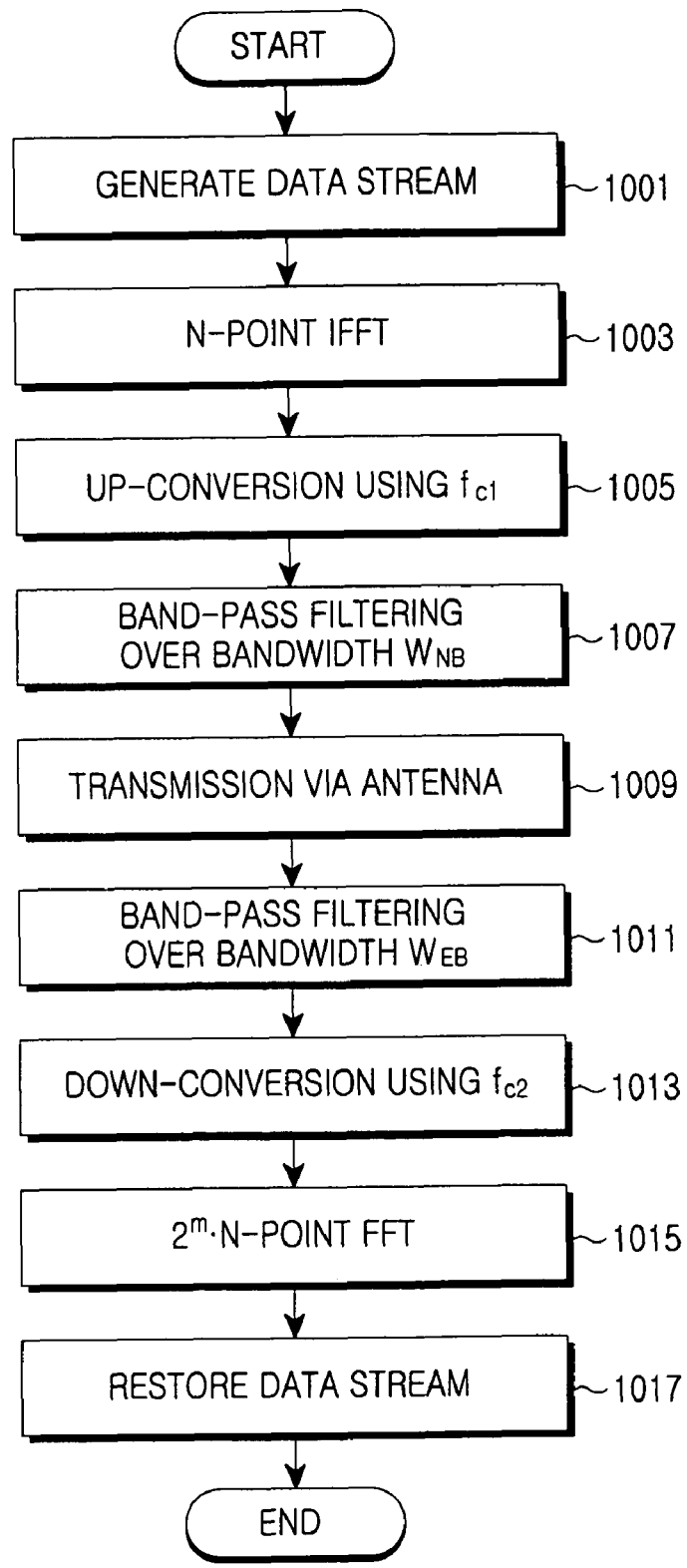
FIG. 10 is a diagram illustrating an uplink data transmission/reception process for an EB communication system according to the present invention.

With reference to FIGS. 9 and 10, a detailed description will now be made of a data transmission/reception process between BS-MS in an EB communication system according to the present invention.

FIG. 9 is a diagram schematically illustrating a downlink data transmission/reception process for an EB communication system according to an embodiment of the present invention. Referring to FIG. 9, in step 901, a BS corresponding to a transmitter in a downlink generates a data stream for downlink data transmission. In step 903, the BS performs $2^m \times N$-point IFFT on the generated data stream. After performing the IFFT process, the BS performs aRF process through an RF processor in steps 905 and 907.

In step 905, the BS performs up-conversion to a band of a carrier frequency $f_{c2}$ used in the EB communication system. In step 907, the BS performs band-pass filtering taking into account a bandwidth $W_{EB}$ occupied by $2^m \times N$ points. In step 909, the BS transmits the final data that passed through the above process, to a receiver, i.e., a MS, via an antenna.

The MS corresponding to the receiver in the downlink receives the signal transmitted from the transmitter, i.e., the BS, via an antenna. In step 911, the MS performs band-pass filtering on the received signal over a bandwidth $W_{NB}$ corresponding N points. In step 913, the MS performs down-conversion on the band-pass filtered signal, using a carrier frequency $f_{c1}$ used in the NB communication system. In step 915, the MS performs N-point FFT on the down-converted signal. In step 917, the MS restores the FFT-processed signal to its original signal, i.e., the data stream transmitted from the BS.

The downlink data transmission/reception process between BS-MS in the EB communication system according to the present invention has been described so far with reference to FIG. 9. Next, with reference to FIG. 10, a description will be made of an uplink data transmission/reception process between BS-MS in the EB communication system according to the present invention.

FIG. 10 is a diagram illustrating an uplink data transmission/reception process for an EB communication system according to the present invention. Referring to FIG. 10, in step 1001, an MS corresponding to a transmitter in an uplink generates a data stream for uplink data transmission. In step 1003, the MS performs N-point IFFT on the generated data stream. After performing the IFFT process, the MS performs an RF process through an RF processor in steps 1005 and 1007.

In step 1005, the MS performs up-conversion to a band of a carrier frequency $f_{c1}$ used in the NB communication system. In step 1007, the MS performs band-pass filtering taking into account a bandwidth $W_{NB}$ occupied by N points. In step 1009, the MS transmits the final data that passed through the above process, to a receiver, i.e., a BS, via an antenna.

The BS corresponding to the receiver in the uplink receives the signal transmitted from the transmitter, i.e., the MS, via an antenna. In step 1011, the BS performs band-pass filtering on the received signal over a bandwidth $W_{EB}$ corresponding $2^m \times N$ points. In step 1013, the BS performs down-conversion on the band-pass filtered signal, using a carrier frequency $f_{c2}$ used in the EB communication system. In step 1015, the BS performs $2^m \times N$-point FFT on the down-converted signal. In step 1017, the BS restores the FFT-processed signal to its original signal, i.e., the data stream transmitted from the MS.

The uplink/downlink data transmission/reception method between BS-MS for the case where the extended bandwidth is a multiple of $2^m$ in the EB communication system according to the present invention has been described so far with reference to FIGS. 9 and 10. Next, a description will be made of an uplink/downlink data transmission/reception method between BS-MS for the case where the extended bandwidth is not a multiple of $2^m$ in the EB communication system.

Figure 11:
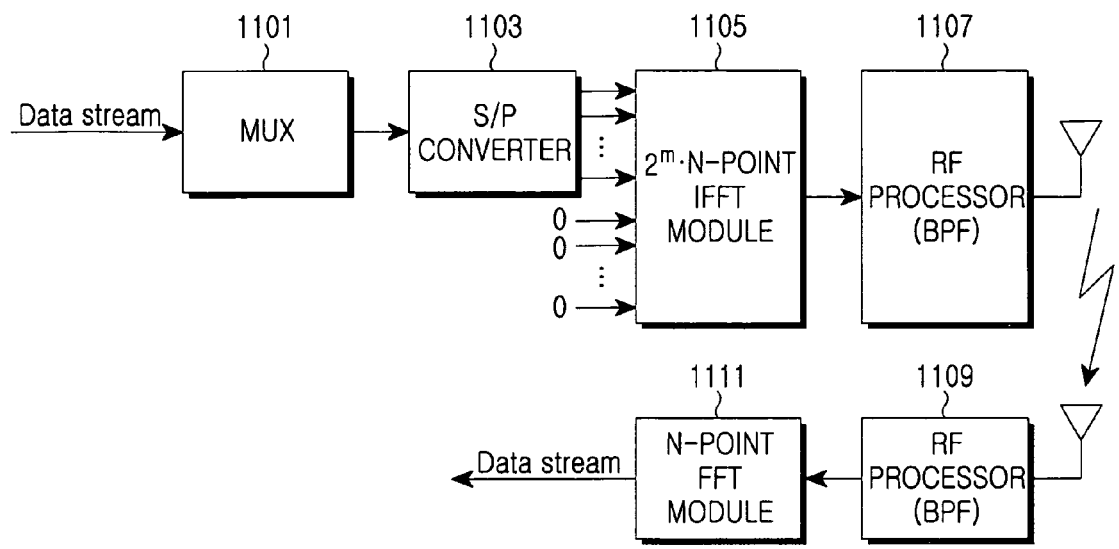
FIG. 11 is a diagram illustrating another preferred downlink data transmission/reception process between BS-MS in an EB communication system according to the present invention.

FIG. 11 is a diagram illustrating another preferred downlink data transmission/reception process between BS-MS in an EB communication system according to the present invention.

Before a description of FIG. 11 is given, it should be noted that FIG. 11 shows a downlink data transmission/reception flow for the EB communication system according to the present invention, wherein an extended bandwidth is not a multiple of $2^m$.

Referring to FIG. 11, for downlink data transmission, a BS generates a data stream. The data stream represents the data that was already channel-coded to increase reliability at the transmitter. Because a detailed method for generating the data stream is not directly related to the present invention, a detailed description thereof will be omitted herein. However, it will be assumed that the data stream includes both traffic information of several users as well as control information. The control information includes information on resource positions to which traffic information of each user is mapped. It is assumed that the resource mapping is achieved such that the users are disjoint from each other in terms of the resources.

The data stream is multiplexed through a multiplexer (MUX) 1101, and then input to a serial-to-parallel (S/P) converter 1103. The S/P converter 1103 parallel-coverts the input data stream and outputs the resultant data stream to a $2^m \times N$-point IFFT module 1105. At this time, the $2^m \times N$-point IFFT module 1105 receives nulling data along with the data stream. Herein, the reason for inserting the nulling data is to combine the actual data and the nulling data and match the combination to $2^m$ points, so that the $2^m \times N$-point IFFT module 1105 performs normal IFFT.

Next, the IFFT-processed data is RF processed by an RF processor 1107, and then transmitted via a transmission antenna. In this case, the RF processor 1107 performs up-conversion on the input data to a band of a carrier frequency $f_{c1}$ used in the NB communication system, and then performs band-pass filtering taking into account a bandwidth $W_{EB}$ occupied by the k×N points, where k denotes a multiple of the bandwidth extended from the existing bandwidth. The data, after passing through the above process, is transmitted to a receiver, e.g., an MS, via the antenna.

An MS corresponding to a receiver in the downlink receives the signal transmitted by the transmitter, i.e., the BS, via an antenna. The MS performs band-pass filtering on the received signal over a bandwidth $W_{NB}$ corresponding to N points through an RF processor 1109. Due to the band-pass filtering over the bandwidth $W_{NB}$, even the data transmitted with a $2^m \times N$-point IFFT module can be restored with only the N-point FFT module rather than the $2^m \times N$-point IFFT module. Subsequently, the band-pass filtered signal is restored to its original signal through an N-point FFT module 1111. That is, based on a control signal, the MS detects a position of a resource allocated thereto, and then restores the traffic signal.

The downlink data transmission/reception method between BS-MS for the case where the extended bandwidth is not a multiple of $2^m$ in the EB communication system according to the present invention has been described so far with reference to FIG. 11. Next, with reference to FIG. 12, a description will be made of an uplink data transmission/reception method between BS-MS for the case where an extended bandwidth is not a multiple of $2^m$ in the EB communication system according to the present invention.

Figure 12:
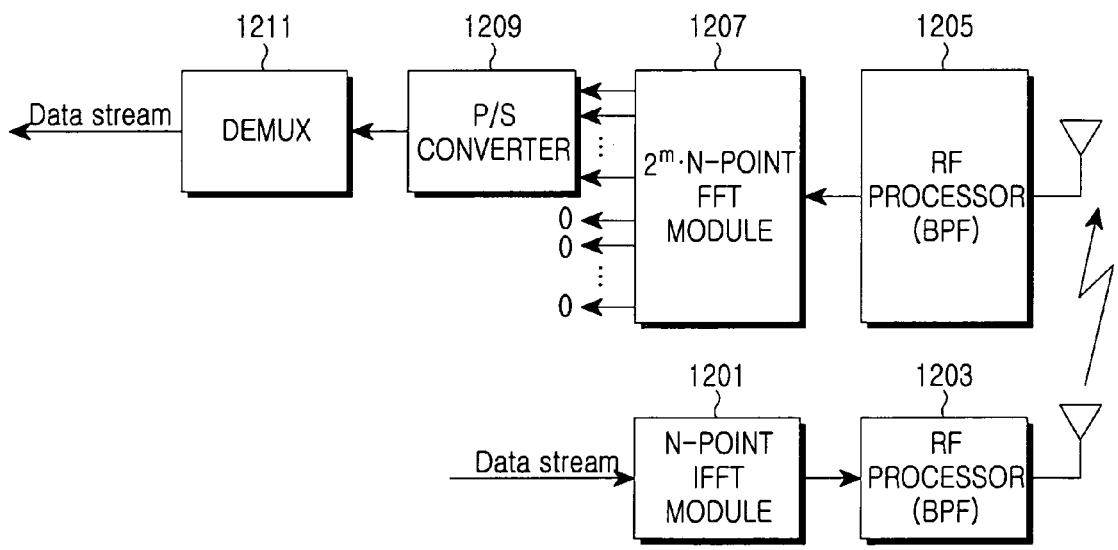
FIG. 12 is a diagram illustrating another preferred uplink data transmission/reception process between BS-MS in an EB communication system according to the present invention.

FIG. 12 is a diagram illustrating another preferred uplink data transmission/reception process between BS-MS in an EB communication system according to the present invention.

Before describing FIG. 12, note that FIG. 12 shows an uplink data transmission/reception flow for an EB communication system according to the present invention, wherein an extended bandwidth is not a multiple of $2^m$.

Referring to FIG. 12, for uplink data transmission, an MS generates a data stream. The data stream represents the data that was already channel-coded to increase reliability at the transmitter. Because a detailed method for generating the data stream is not directly related to the present invention, a detailed description thereof will be omitted herein. However, it will be assumed that the data stream includes both uplink traffic information as well as control information. Therefore, the resource mapping of the uplink traffic information is achieved such that the users are disjoint from each other in terms of the resources.

Thereafter, the data stream passes through an N-point IFFT module 1201. The IFFT-processed data is up-converted to a band of a carrier frequency $f_{c1}$ used in the NB communication system through an RF processor 1203, and then is subject to band-pass filtering taking into account a bandwidth $W_{NB}$ occupied by N points. The data, after passing through the above process, is transmitted via a transmission antenna.

A BS corresponding to a receiver in the uplink receives the signal transmitted from the transmitter, i.e., the MS, via a reception antenna, and then performs band-pass filtering on the received signal over a bandwidth $W_{EB}$ corresponding to k×N points. Due to the band-pass filtering over the bandwidth $W_{EB}$, even the data transmitted with an N-point IFFT module can be restored through the $2^m \times N$-point FFT process rather than the N-point IFFT process.

Only the k×N data points are selected from the $2^m \times N$ data symbols as data, and the remaining data is disregarded because it is a nulling part. This is similar to that of the downlink, so a detailed description thereof will be omitted.

Another preferred uplink/downlink data flow in the EB communication system according to the present invention has been described so far with reference to FIGS. 11 and 12. Next, a detailed description will be made of a data transmission/reception process between BS-MS for the case where an extended bandwidth is not a multiple of $2^m$ in the EB communication system according to the present invention.

Figure 13:
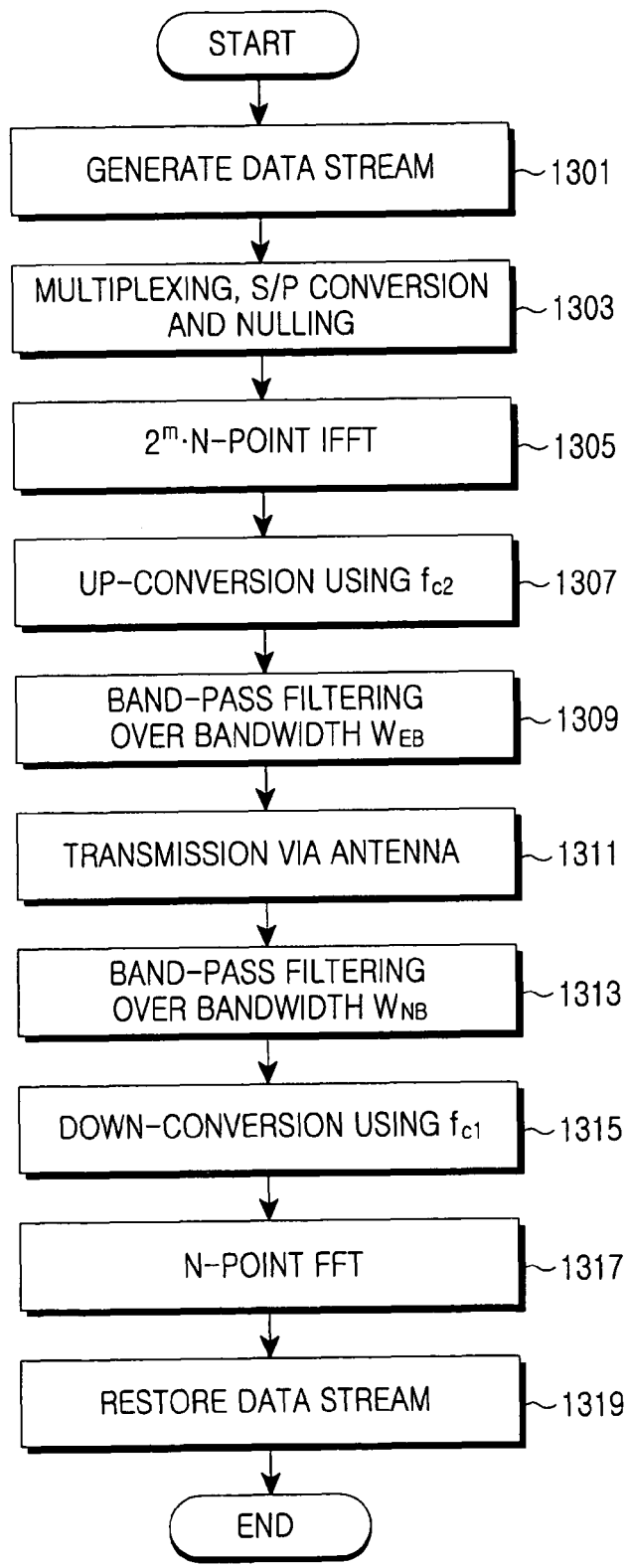
FIG. 13 is a diagram illustrating a downlink data transmission/reception process for an EB communication system according to the present invention.

FIG. 13 is a diagram illustrating a downlink data transmission/reception process for an EB communication system according to the present invention.

Referring to FIG. 13, in a downlink data transmission/reception process between BS-MS for the case where an extended bandwidth is not a multiple of $2^m$, a BS corresponding to a transmitter in a downlink generates a data stream for downlink data transmission in step 1301. In step 1303, the BS performs multiplexing and S/P conversion on the generated data stream, and then combines the resultant data stream with a nulling part. In step 1305, the BS performs $2^m \times N$-point IFFT on the data stream combined with the nulling part. After performing the IFFT process, the BS performs an RF process through an RF processor in steps 1307 and 1309.

In step 1307, the BS performs up-conversion to a bandwidth $W_{EB}$ of a carrier frequency $f_{c2}$ of the EB communication system. In step 1309, the BS performs band-pass filtering taking into account a bandwidth $W_{EB}$ occupied by $2^m \times N$ points. In step 1311, the BS transmits the data that passed through the above process, via an antenna.

An MS corresponding to a receiver in the downlink receives the signal transmitted from the transmitter, i.e., the BS, via an antenna. In step 1313, the MS performs band-pass filtering on the received signal over a bandwidth $W_{NB}$ corresponding to N points. In step 1315, the MS performs down-conversion on the band-pass filtered signal using a carrier frequency $f_{c1}$ of the NB communication system. In step 1317, the MS performs N-point FFT on the down-converted signal. In step 1319, the MS restores the FFT-processed signal to its original signal, i.e., the data stream transmitted from the BS.

The downlink data transmission/reception process between BS-MS for the case where the extended bandwidth is not a multiple of $2^m$ in the EB communication system according to the present invention has been described so far with reference to FIG. 13. Next, with reference to FIG. 14, a detailed description will be made of an uplink data transmission/reception process between BS-MS for the case where the extended bandwidth is not a multiple of $2^m$ in the EB communication system according to the present invention.

Figure 14:
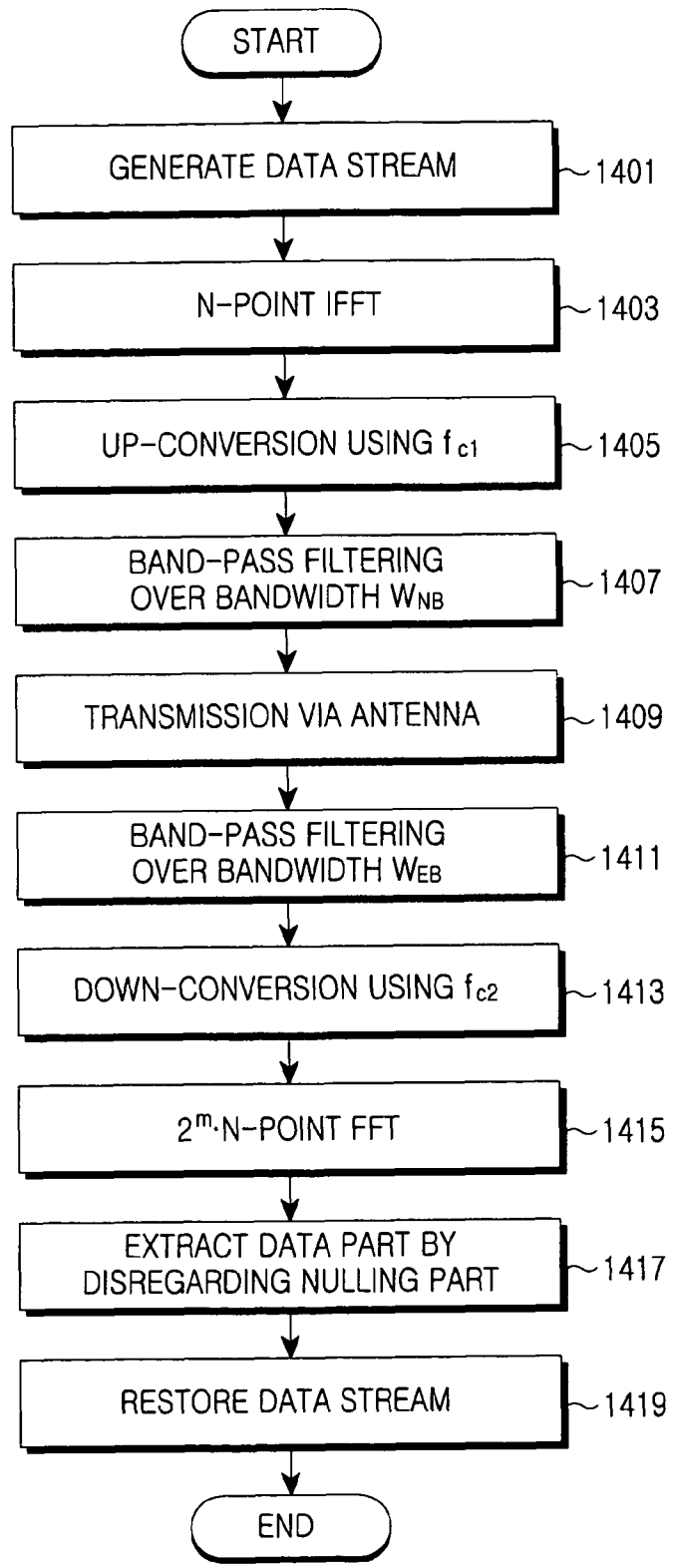
FIG. 14 is a diagram illustrating an uplink data transmission/reception process for an EB communication system according to the present invention.

FIG. 14 is a diagram schematically illustrating an uplink data transmission/reception process for an EB communication system according to the present invention. Referring to FIG. 14, in an uplink data transmission/reception process between BS-MS for the case where an extended bandwidth is not a multiple of $2^m$, an MS corresponding to a transmitter in an uplink generates a data stream for uplink data transmission in step 1401. In step 1403, the MS performs N-point IFFT on the generated data stream. After performing the IFFT process, the MS performs an RF process through an RF processor in steps 1405 and 1407.

In step 1405, the MS performs up-conversion to a band of a carrier frequency $f_{c1}$. In step 1407, the MS performs band-pass filtering taking into account a bandwidth $W_{NB}$ occupied by N points. In step 1409, the MS transmits the data that passed through the above process, via the antenna.

A BS corresponding to a receiver in the uplink receives the signal transmitted from the transmitter, i.e., the MS, via an antenna. In step 1411, the BS performs band-pass filtering on the received signal over a bandwidth $W_{EB}$ corresponding to $2^m \times N$ points. In step 1413, the BS performs down-conversion on the band-pass filtered signal using the carrier frequency $f_{c2}$. In step 1415, the BS performs $2^m \times N$-point FFT on the down-converted signal. In step 1417, the BS extracts only the data from the FFT-processed signal, disregarding the nulling part. In step 1419, the BS restores the extracted data to its original signal, i.e., the data stream transmitted from the MS.

The present invention has the following advantages.

(1) Reduction in License Cost for Frequency Band The use of the frequency overlay scheme according to the present invention requires only the additional license cost for the additionally increased bandwidth. As a result, the burden of the license cost for the frequency bands on the service providers decreases because they are allowed to bear only the additional license cost.

(2) Increase in Frequency Resource Efficiency in Overlay Frequency Bandwidth

The use of the frequency overlay scheme according to the present invention increases frequency resource efficiency in the overlaid frequency band. That is, basically, user access increases in number in the overlay frequency band, maximizing the multiuser diversity gain. The maximization of the multiuser diversity gain contributes to an increase in the frequency resource efficiency. Because the frequency resource efficiency is closely related to the profits the service provides, the use of the frequency overlay scheme gives the economic advantages to the service providers.

(3) Guarantee on Functions of Existing Users in Overlay Frequency Band

The application of the frequency overlay scheme according to the present invention guarantees the intact functions of the existing users, i.e., NB-MSs, before the application of the frequency overlay scheme.

(4) Preparation for Extension to Broadband System Supporting Backward Compatibility Because the application of the frequency overlay scheme according to the present invention guarantees the intact functions of the existing users, i.e., NB-MSs, before the application of the frequency overlay scheme, and also supports the broadband service, it can provide a basis of the evolutionary development to the next generation communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting/receiving data in a frequency overlay communication system, the method comprising the steps of:

generating, by a base station, a data stream for data transmission, and performing Inverse Fast Fourier Transform (IFFT) on the generated data stream according to IFFT points corresponding to a predetermined first frequency band before transmission; and upon receiving a particular signal distributed across the first frequency band, performing, by a mobile station, Fast Fourier Transform (FFT) on the received signal according to FFT points corresponding to a predetermined second frequency band, and restoring the received signal, wherein the first frequency band and the second frequency band have different frequency bandwidths, and the second frequency band is included in the first frequency band, and wherein the number of the IFFT points is $M=2^m \times N$, where the number of the FFT points is N, and $2^m$ is the ratio of a width of the second frequency band to a width of the first frequency band.

2. The method of claim 1, further comprising:

after performing the IFFT, performing up-conversion to a carrier frequency band used in the first frequency band; and performing band-pass filtering on the up-converted data taking into account a bandwidth corresponding to the first frequency band.

3. The method of claim 1, further comprising, upon receiving the particular signal, performing band-pass filtering on the received signal over a bandwidth corresponding to the second frequency band, and then performing FFT on the band-pass filtered signal.

* * * * *